(12) United States Patent
Lu et al.

(10) Patent No.: US 10,965,560 B2
(45) Date of Patent: *Mar. 30, 2021

(54) ORGANIZING AND STORING NETWORK COMMUNICATIONS

(71) Applicant: Trend Micro Incorporated, Tokyo (JP)

(72) Inventors: Wei Lu, Austin, TX (US); Leslie Zsohar, Austin, TX (US); Edward A. Wartha, Austin, TX (US); Randal Mullin, Austin, TX (US); Craig Botkin, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,239

(22) Filed: Feb. 18, 2020

(65) Prior Publication Data
US 2020/0186451 A1 Jun. 11, 2020

Related U.S. Application Data

(63) Continuation of application No. 15/729,344, filed on Oct. 10, 2017, now Pat. No. 10,608,902, which is a continuation of application No. PCT/US2015/026476, filed on Apr. 17, 2015.

(51) Int. Cl.
*H04L 12/26* (2006.01)
*H04L 12/851* (2013.01)

(52) U.S. Cl.
CPC ............ *H04L 43/04* (2013.01); *H04L 43/026* (2013.01); *H04L 47/2441* (2013.01)

(58) Field of Classification Search
CPC .... H04L 43/04; H04L 43/026; H04L 47/2441
See application file for complete search history.

(56) References Cited

U.S. PATENT DOCUMENTS

| 8,755,381 | B2* | 6/2014 | Hughes | H04L 49/9047 370/392 |
| 2013/0227691 | A1* | 8/2013 | Aziz | H04L 63/145 726/24 |
| 2014/0237118 | A1* | 8/2014 | Matthews | H04L 47/2441 709/226 |
| 2015/0212949 | A1* | 7/2015 | Orihara | G06F 12/0873 711/136 |

* cited by examiner

*Primary Examiner* — Habte Mered
(74) *Attorney, Agent, or Firm* — Okamoto & Benedicto LLP (57) ABSTRACT

Examples relate to organizing and storing network communications. In one example, a programmable hardware processor may: receive a first set of network packets; identify, for each network packet included in the first set, a network flow, each network flow including at least one related packet; store each network packet included in a subset of the first set in a first data storage device; for each network packet included in the subset, organize the network packet according to the network flow identified for the network packet; identify, from the network flows, a set of network flows that each have at least one characteristic of interest; and store, in a second data storage device, each network packet included in each network flow of the set of network flows.

20 Claims, 4 Drawing Sheets

ORGANIZING AND STORING NETWORK COMMUNICATIONS

CROSS-REFERENCE TO RELATED APPLICATIONS

This application is a continuation of U.S. application Ser. No. 15/729,344, filed on Oct. 10, 2017, now U.S. Pat. No. 10,608,902, which is a continuation of International Application No. PCT/US2015/026476, with an International Filing Date of Apr. 17, 2015. The just-mentioned related applications are incorporated herein by reference in their entirety.

BACKGROUND

Network communications between computing devices are often carried out by transmitting network packets from one device to another, e.g., using a packet-switched network. Many different types of network packets having a variety of characteristics may be transmitted between computing devices. Network administrators often monitor various aspects of network traffic going into and out of their respectively managed networks, e.g., looking for problems or anomalies, such as malfunctioning or misconfigured devices, or malicious actors.

BRIEF DESCRIPTION OF THE DRAWINGS

The following detailed description references the drawings, wherein.

DETAILED DESCRIPTION

A significant volume and variety of network traffic often flows between computing devices operating on a packet-switched network. Using one or more devices having programmable hardware processors, such as a field-programmable gate array (FPGA), network traffic may be captured, stored, organized, and filtered as it flows through a network. In particular, individual network flows and/or network packets of interest may be identified and stored for later analysis, e.g., for analytics and/or security purposes. Using multi-stage storage, with dynamically configurable filtering and purging at each stage, may facilitate analysis of network traffic of interest in a manner designed to be relatively fast and efficient For example, a network device may use an FPGA configured to process all network traffic that flows through it. The FPGA may identify, for each network packet processed, a network flow for the packet. Network flows generally include related network packets, e.g., network packets used to send an e-mail may be considered part of the same network flow. All of the packets may be stored in a first data storage device, indexed by their corresponding network flow. Packets belonging to a network flow may not be received by the FPGA in sequential order and may be separated by relatively long periods of time and/or other network packets. When additional packets belonging to an existing network flow are received by the FPGA, they may be indexed according to the existing network flow and stored in the first storage device.

The types of storage devices used at different stages of storage may vary, and the first stage of storage may be designed to store all or a subset of the received packets quickly and for a relatively short period of time. Due to the volume of incoming network packets, the first stage of storage is periodically cleared and/or overwritten by more recently received network packets. Prior to network packets being cleared from or overwritten in the first storage device, the FPGA may identify network packets and/or network flows of interest, and move those network packets to a second storage device. The FPGA determines which network packets and/or flows are sent to the second storage device based on characteristics of the network packets and the current configuration of the FPGA. For example, the FPGA may be configured to send all network packets using the POP or IMAP protocol to the second storage device. The second storage device may be designed to store the network packets of interest for a relatively moderate period of time, e.g., a period of time longer than packets are stored at the first stage, to make packets stored at the second stage available for analysis by a third party device/system. The network packets stored at the second stage may be indexed, for example, according to their corresponding network flows.

In some implementations, additional stages of storage may be used. As with the first storage device, the second storage device may be periodically cleared and/or overwritten by more recently received network packets/flows of interest. Prior to the network packets/flows of interest being cleared and/or overwritten, the FPGA may identify a subset of the network packets/flows of interest to be stored in a third data storage device. As with the network packets/flows of interest selected for storing in the second storage device, the characteristics of the network packets may be used to determine whether network packets are moved from the second storage device to the third storage device. For example, the FPGA may be configured to move the first and last network packet of each POP or IMAP protocol network flow to the third storage device. The third storage device may be designed to store the network packets for a relatively long period of time, e.g., a period of time longer than packets are stored at the second stage, to make packets stored at the third stage available for analysis by a third party device/system and/or for permanent storage. The network packets stored at the third stage may be indexed, for example, according to their corresponding network flows.

As noted above, the characteristics of interest used to identify network packets and flows of interest are based on the configuration of the FPGA. The configuration used may be specified, for example, by a third party device and/or a system administrator. In some situations, the characteristics of interest identified at a particular stage have a correlation to the characteristics of interest of a previous stage, e.g., characteristics for storing packets in a second stage may include network packet content deemed potentially malicious based on a blacklist, and characteristics for storing packets in a third stage may include network packet content including data associated with a particular type of malicious software.

The hardware processor or processors used to selectively store and organize the network packets may be configured in a variety of ways. Changing the configuration of the hardware processor(s) may allow for storage of network packets in different ways. For example, the characteristics of interest used to determine which packets are moved from one stage of storage to another may be updated, resulting in different types of network packets being stored at the various stages. Additional details regarding the organizing and storage of network packets are described in further detail in the paragraphs that follow.

Figure 1:
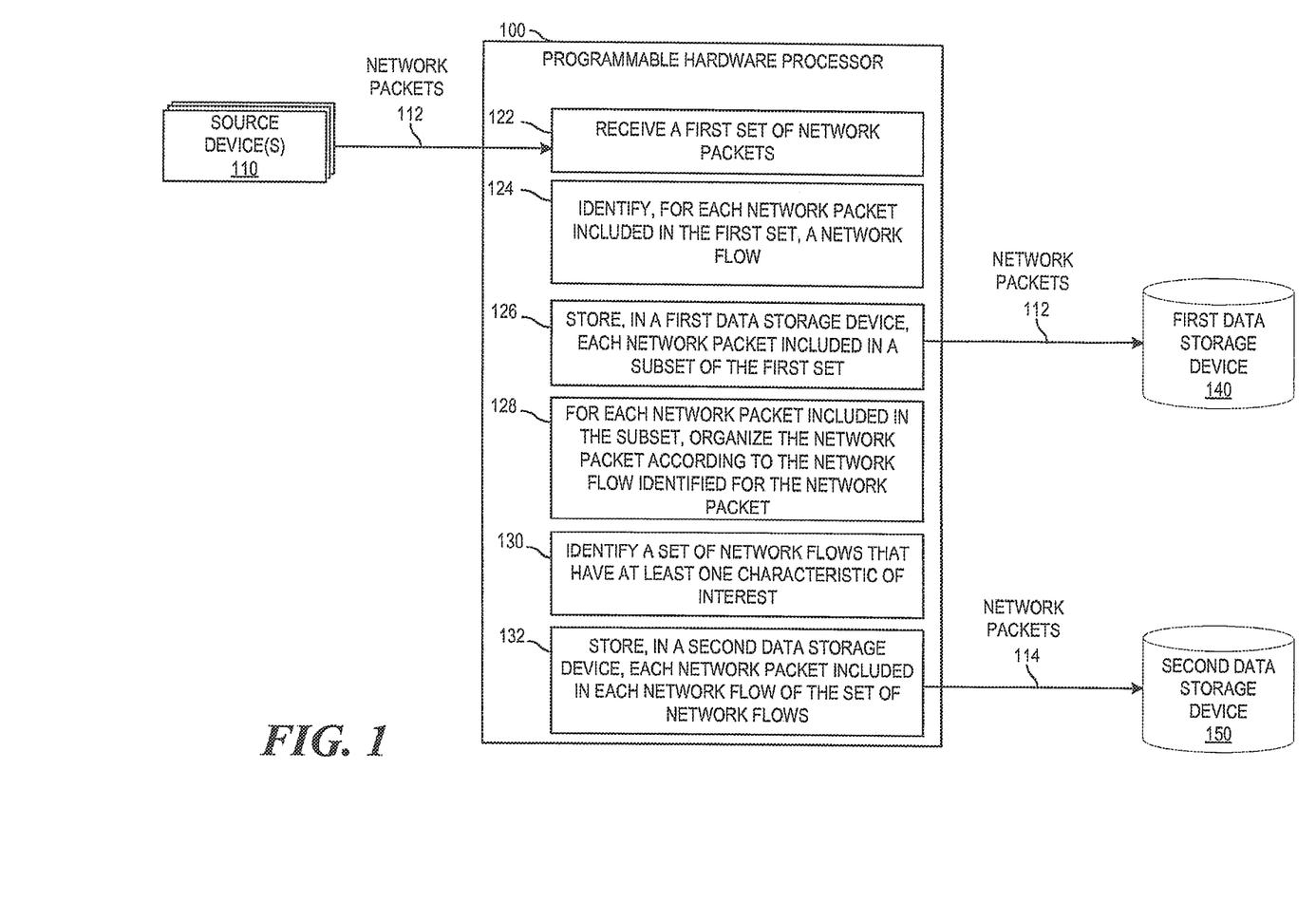
FIG. 1 is a block diagram of an example programmable hardware processor for organizing and storing network communications.

FIG. 1 is a block diagram of an example programmable hardware processor 100 for organizing and storing network communications. Programmable hardware processor 100 may be included, for example, in network device, such as a standalone network device, a network switch, router, or any other electronic device suitable through which network packets flow in a packet-switched network.

Programmable hardware processor 100 may include one or more electronic circuits that include electronic components for performing actions, such as actions 122-132. The programmable hardware processor 100 may be, for example, an FPGA, an application-specific integrated circuit (ASIC), an application-specific instruction set processor (ASIP), a complex programmable logic device (CPLD), to name a few. In some implementations, multiple programmable hardware processors, of the same type or combination of types, may be used, e.g., to perform actions 122-132.

Data storage devices, such as the first data storage device 140 and the second data storage device 150 may be any electronic, magnetic, optical, or other physical storage device that may contain or store data. Storage devices 140 and 150 may be, for example, Random Access Memory (RAM), an Electrically Erasable Programmable Read-Only Memory (EEPROM), a storage device, an optical disc, a solid state drive (SSD), a magnetic hard drive, and the like.

As shown in FIG. 1, the programmable hardware processor 100 receives a first set of network packets 112 from a source device 110 (122). The set of network packets 112 may include, for example, any combination of TCP/IP, UDP, ICMP, HTTP, POP, FTP, IMAP, or another type of network packet, which generally comprises a header portion and a payload portion. The source device 110 may be any device through which network packets are transmitted, such as a personal computer, mobile phone, server computer, network router, network switch, or other computing device or network device from which the network packets 112 are received.

The programmable hardware processor 100 identifies, for each network packet included in the first set, a network flow (124). Each network flow includes at least one related packet. For example, network packets may be related—and be identified as part of the same network flow—based on a variety of characteristics and/or combinations of characteristics. For example, network packets having the same source and destination address, network packets having the same source port and destination port, and/or network packets having the same network protocol, may be identified as being part of the same flow. The exact manner in which the programmable hardware processor 100 identifies packets as belonging to a flow may vary, and may be specified by a configuration for the programmable hardware processor 100. In some implementations, a network flow may include only one network packet.

The programmable hardware processor 100 stores each network packet included in a subset of the first set in a first data storage device 140 (126). The first data storage device 140 may be, for example, RAM which is designed to quickly store received network packets 112. In situations where network traffic is relatively high, having a relatively fast storage device may facilitate the ability to store all or a large subset of the network packets 112 received by the programmable hardware processor 100. In some implementations, the programmable hardware processor 100 may selectively store network packets in the first data storage device 140 based on one or more characteristics of the network packets. For example, certain types of packets may be whitelisted, indicating that there is no need to store them for further analysis. The subset of received packets chosen for storage, or not chosen, may vary, and may depend upon the configuration of the programmable hardware processor 100, which may change, e.g., based on instructions received from a third party device.

For each network packet included in the subset, the programmable hardware processor 100 organizes the network packet according to the network flow identified for the network packet (128). Incoming network packets 112, while described as being received as part of a set, may, in some situations, be part of a stream of network packets received and processed by the programmable hardware processor 100. In some implementations, packets may be processed serially, e.g., as they are received, and related packets belonging to the same network flow as other network packets may be received out of order and/or with unrelated network packets in between. Organizing the network packets 112 stored in the first data storage device 140 includes, for example, using one or more of a variety of indexing and/or sorting methods to sort, index, or otherwise organize the network packets. Organization of the network packets, e.g., in an index, may facilitate retrieval of particular network packets and/or network flows, e.g., by third party device or system.

The programmable hardware processor 100 identifies a set of network flows that have at least one characteristic of interest (130). In some implementations, the characteristics are dynamically updateable and include, for example, a network packet protocol characteristic and/or a network packet content characteristic, e.g., for identifying packets of a certain protocol type, or packets including particular content, as a packet of interest. Characteristics of interest may include, for example: particular characteristics which may be indicative of malware, e.g., identified based on deep inspection of the packets and blacklist comparisons; unexpected volume of network traffic, e.g., from a network device that was previously identified as suspicious; unexpected volume of network traffic between any two network devices; and/or flow constructions that indicate intent to bypass or mislead network security devices and/or administrators.

The characteristics of interest may be changed, for example, by changing the configuration of the programmable hardware processor 100. In some implementations, additional configurations are stored in a storage device accessible to the programmable hardware processor 100, and may be applied, for example, based on various triggering conditions and/or third party provided instructions. In some implementations, the programmable hardware processor 100 may be in communication with additional programmable processors and/or third party computing devices that analyze network flows stored in the first data storage device 140. In this situation, the additional programmable processor(s) and/or third party computing device(s) may facilitate identification of network flows having characteristics of interest. By way of example, a third party computing device may analyze the content of network flows looking for packet content included in a security blacklist. Upon identification of content included in the security blacklist, or identification of other characteristics of interest, the third party computing device may cause the corresponding network packets/flows to be stored in a subsequent stage of storage for further analysis.

The programmable hardware processor 100 stores, in a second data storage device 150, each network packet included in each network flow of the set of network flows (132). In this situation, network packets 114 and/or flows that were identified as having characteristics of interest are stored in the second data storage device 150. The second data storage device 150 may be, for example, an SSD device, which is designed to hold data for a relatively moderate period of time. Network traffic stored in the second storage device 150 may be made available for inspection by a third party device, e.g., to analyze the packets for malware, prior to the packets being purged, overwritten, or moved to another storage device. In some implementations, additional programmable hardware processors and/or third party computing devices may identify packets of interest to be moved to the second data storage device 150, e.g., based on different characteristics of interest or user selection. Network packets and/or flows stored in the second storage device 150 may, in some implementations, be organized according to the corresponding network flow.

In some implementations, the programmable hardware processor 100 may receive, subsequent to receiving the first set of network packets 112, a second set of network packets. As with the first set of network packets 112, packets included in the second set may be stored and organized according to their respective network flows. In situations where a packet in the second set is in the same network flow as an existing packet or packets stored in the first and/or second storage device, the packet may be stored in accordance with the same network flow. In situations where the packets in the second set are not associated with an existing network flow, they may be stored and organized in accordance with their newly identified network flows.

When storing subsequently received network packets in the first data storage device 140, previously stored packets may need to be removed from the first storage device 140 or overwritten by the subsequently received network packets. For example, to ensure time for identifying packets having characteristics of interest, packets stored in the first data storage device 140 may be removed or overwritten in a first-in, first-out manner, e.g., the packets stored for the longest period of time are the first to be removed or overwritten by new packets.

In some implementations, one or more additional storage devices may be used to store packets having particular characteristics. For example, the programmable hardware processor 100 may identify packets included in the second data storage device 150 that have one or more characteristics of interest. The characteristics of interest may be different from the characteristics of interest used to determine which network packets/flows were stored in the second data storage device 150. After identifying the packets having the characteristics of interest, they may be stored in a third storage device.

By way of example, an FPGA with three stages of storage may store every packet received in a first stage of storage, e.g., in RAM. When configured to identify IMAP packets as packets of interest, the FPGA may identify network flows that include IMAP packets and store the network flows—which include the IMAP packets—in the second stage of storage, e.g., an SSD. From the network flows stored at the second stage, the FPGA may identify individual IMAP packets having characteristics of interest, e.g., the first and last packets of an IMAP flow, and store those individual IMAP packets in a third stage of storage, e.g., a magnetic hard drive. At each stage of storage, the packets may be available for inspection by a third party device. For example, a malware detection device may be looking for malware in IMAP packets and isolation of particular IMAP flows/packets may facilitate identification of malware by the detection device.

The example implementation of the programmable hardware processor 100 and other devices depicted in FIG. 1 may vary. For example, in some implementations, multiple programmable hardware processors may be used to perform various actions, e.g., actions 122-132. In some implementations, the order in which actions are performed may vary. For example, network packets may be organized before, after, or in parallel with the act of storing the network packets. In some implementations, each data storage device, e.g., 140 and 150, may be one or more storage devices, e.g., multiple RAM modules and/or hard drive arrays. Other configurations may also be used to store and organize network communications.

Figure 2:
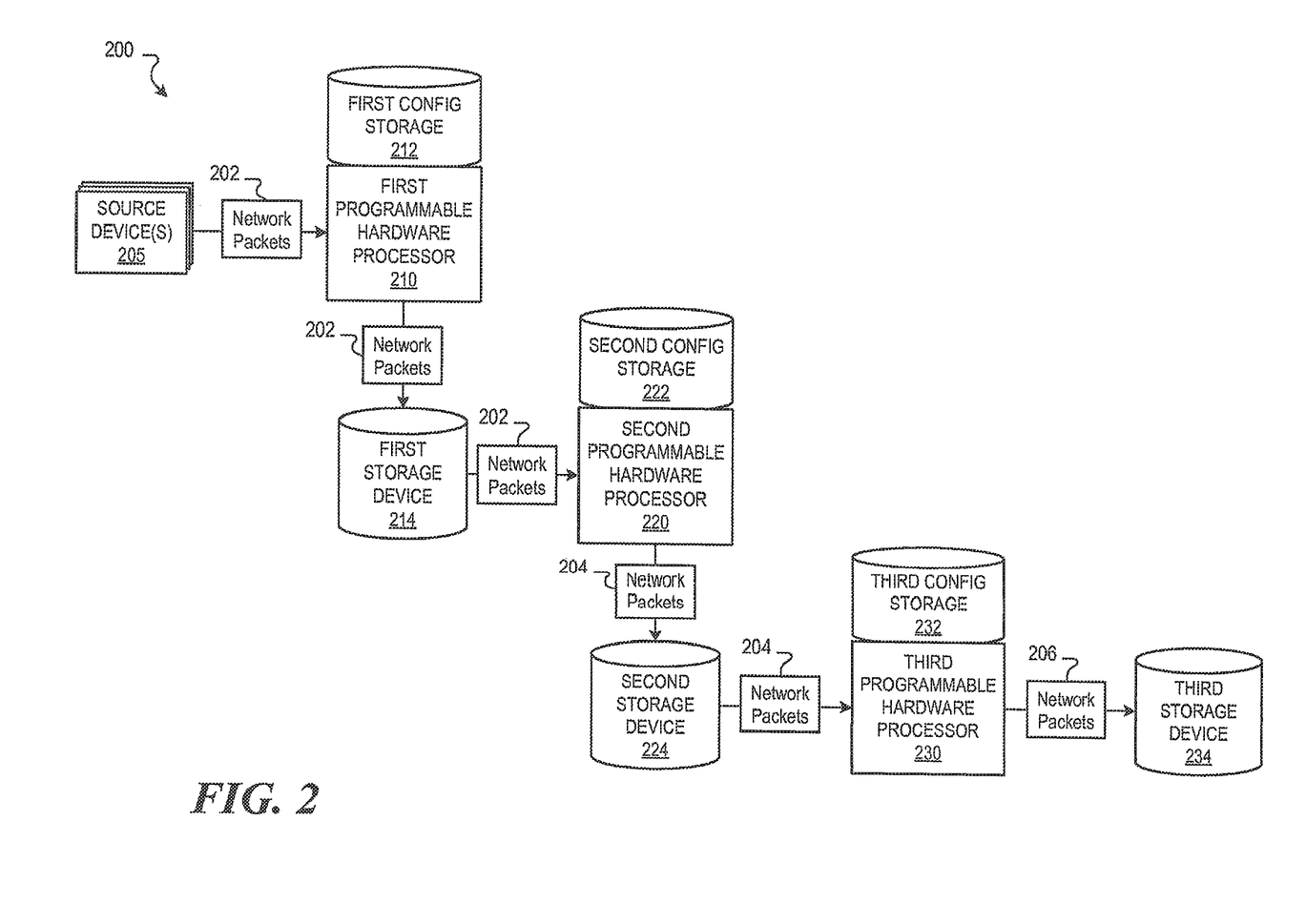
FIG. 2 is an example data flow for organizing and storing network communications using multiple programmable hardware processors.

FIG. 2 is an example data flow 200 for organizing and storing network communications using multiple programmable hardware processors. In the example data flow 200, one or more source device(s) 205 provide network packets 202 to a first programmable processor 210. The source devices 205 may be any devices capable of transmitting network packets, e.g., border routers at the edge of a network, network switches, server computers, and load balancers, to name a few. The first programmable processor 210 is coupled to a first configuration storage device 212 that may include one or more configurations for the first programmable processor 210. Each configuration, when implemented by the first programmable processor 210, may vary from other configurations in the manner in which they cause network packets to be handled.

The first programmable processor 210 stores each of the received network packets 202 in a first storage device 214. The network packets 202 may, in some implementations, be organized according to their corresponding network flows, e.g., as identified by the first programmable processor 210. In some implementations, each network packet 202 is also associated with a timestamp, which may indicate when the network packet 202 was received or stored in the first storage device 214. In implementations where the first programmable processor 210 is configured to selectively store the received network packets 202, only a subset of the received network packets 202 may be stored in the first storage device 214.

A second programmable hardware processor 220 receives the network packets 202 from the first storage device 214 and identifies network packets and/or network flows that have one or more characteristics of interest. The second programmable processor 220 may be configured in a variety of ways to identify a variety of packet characteristics as characteristics of interest. The various configurations may be stored, for example, in the second configuration storage 222 and may be applied at the instructions of a third party device, such as a user device controlling the second programmable hardware processor 220. The network packets 204 of network flows that have characteristics of interest are stored in a second storage device 224. In some implementations, the second programmable hardware processor 220 organizes the network packets 204 stored in the second storage device 224 according to their corresponding network flows.

A third programmable hardware processor 230 receives the network packets 204 from the second storage device 224 and identifies individual network packets that have one or more characteristics of interest. The characteristics of interest at this third stage may vary from those used by the second programmable hardware processor 220 in the second stage, and there may be a correlation between characteristics of interest between stages. For example, characteristics of interest may be more specific or granular at later stages of storage. As with the second programmable processor 220, the third programmable processor 230 may be configured in a variety of ways to identify a variety of packet characteristics as characteristics of interest. The various configurations may be stored, for example, in the third configuration storage 232 and may also be applied at the instructions of a third party device. The individual network packets 206 having the characteristics of interest are stored in a third storage device 234. In some implementations, the third programmable processor organizes the network packets 206 stored in the third storage device 234 according to their corresponding network flows.

As additional network packets flow through the example data flow 200, the storage devices 214, 224, and 234, may near or reach storage capacity over time. The first storage device 214, for example, may receive every network packet, or a large subset of all network packets, flowing through the first programmable hardware processor 210, which may be capable of processing network traffic exceeding 10 Gigabits per second in real or near-real time. Due to a limited storage capacity, each storage device is periodically purged of existing network packets or overwritten by incoming network packets. For example, when the first storage device 214 is at or near a particular capacity limit, new packets may overwrite the oldest packets, e.g., by using packet timestamps to overwrite the oldest packets first. The second and third storage devices may be managed in a similar manner, e.g., periodically clearing network packets and/or overwriting the oldest network packets with more recently received network packets. In some implementations, storage devices may be swapped for a stage of storage, such as the third stage, allowing permanent storage of all packets stored at a particular stage. For example, when the third storage device 234 is at capacity, the third programmable processor 230 may store network packets in a different storage device, allowing the full third storage device 234 to be kept, e.g., for backup and/or analysis purposes.

Each storage device may be accessible to one or more third party computing devices. Third party devices may include system administrator devices and/or analytics devices that use the data stored at the various stages, e.g., to identify network anomalies, potentially malicious network behavior, or to otherwise manage the network through which the network packets 202 flow. In some implementations, additional programmable processors and/or storage devices may be used, e.g., for additional stages of storage and network packet selection. In some implementations, one or more programmable hardware processors may be configured to identify and store network packets of interest in separate storage pipelines. For example, a programmable hardware processor may be configured to i) identify IMAP packets as packets of interest for storing in a subsequent storage device, and ii) identify POP packets as packets of interest for storing in a different subsequent storage device. This allows, for example, the use of separate processing, storage, and analysis pipelines originating from the same set of network packets and programmable hardware processor(s).

Figure 3:
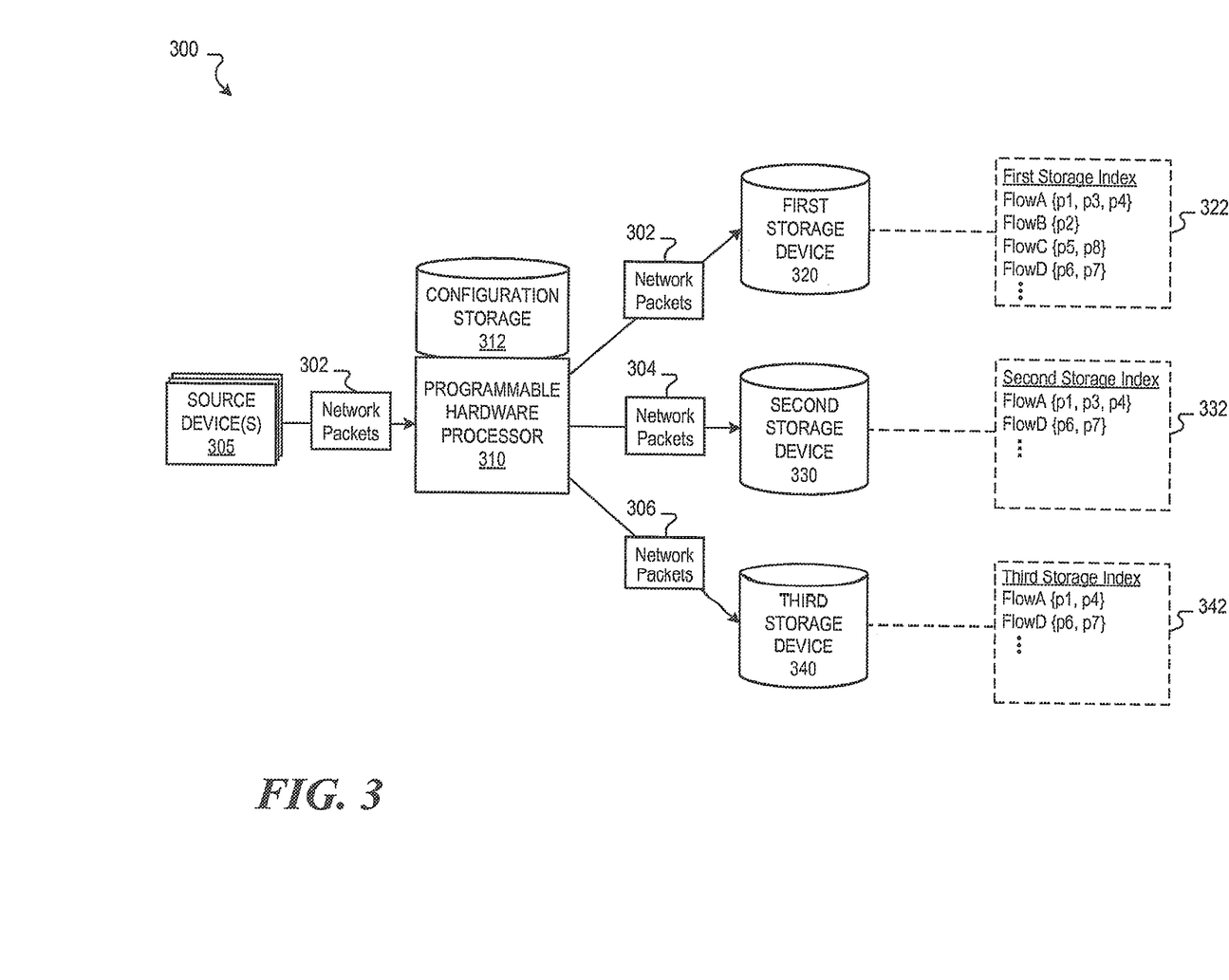
FIG. 3 is an example data flow for organizing and storing network communications using a single programmable hardware processor.

FIG. 3 is an example data flow 300 for organizing and storing network communications using a single programmable hardware processor 310. The actions performed by the programmable hardware processor 310 are similar to the actions performed by the three programmable hardware processors described with respect to FIG. 2 above. For example, the programmable hardware processor 310 receives network packets from one or more source device(s) 305, which may include network devices capable of transmitting network packets.

The programmable hardware processor 310 stores each of the received network packets in a first storage device 320 and, in the example data flow 300, organizes the packets by indexing the packets according to their corresponding network flow. For example, the first storage index 322 indicates that eight packets, p1-p8, are each indexed according to one of four network flows, FlowA, B, C, and D. Additional network packets and flows may be stored and indexed in the first storage device 320, and the data stored in the first storage device, as well as the index, may change over time, e.g., as new packets are received and older packets are removed or overwritten.

The programmable hardware processor 310 stores, in the second storage device 330, network packets 304 of network flows that are identified as having one or more characteristics of interest. For example, in situations where the programmable hardware processor 310 is configured to identify FTP network flows as packets/flows of interest, each packet of an FTP network flow may be stored in the second storage device 330. As shown in the example second storage index 332, the packets of interest are indexed according to their corresponding network flows, e.g., FlowA, comprising packets p1, p3, and p4; and FlowD, comprising packets p6 and p7, may be FTP network flows stored in the second storage device 330.

In some implementations, the network packets stored in later storage stages may be deleted from or overwritten in the prior storage stage. For example, to make room for storing additional packets in the first storage device 320, network packets in the first storage device 320 associated with FlowA and FlowD may be deleted or overwritten when they are moved to the second storage device 330. In some implementations, copies of the network packets are stored at each stage of storage. For example, to facilitate analysis being performed by third party devices at each stage of storage, FlowA and FlowD may remain in the first storage device 320 when they are also stored in the second storage device 330.

The programmable hardware processor 310 stores, in the third storage device 340, network packets 306 that are identified as having one or more characteristics of interest. For example, in situations where the programmable processor 310 is configured to identify the first and last packets of an FTP network flow as characteristics of interest, each first and last packet of an FTP network flow may be stored in the third storage device 340. As shown in the example third storage index 342, the first and last packets for FlowA (p1 and p4) and FlowD (p6 and p7) are stored in the third storage device 340.

In situations where additional network packets belonging to a network flow are received, they may be stored and organized according to the existing network flows. For example, an additional packet, p9, may be received by the programmable hardware processor 310. The packet will be stored in the first storage device 320, and if the packet is identified as belonging to FlowD, for example, it will be indexed according to FlowD. If, as in the foregoing example, the additional packet is an FTP packet, in situations where FTP packet flows are identified as network flows of interest, p9 is also stored in the second storage device 330. In the example situation where the first and last packets of an FTP flow are identified as packets of interest for storage in the third stage, the additional packet, p9, may also be stored in the third storage device 340 because, in this example, it is the last packet of the FTP flow, FlowD. Packet p7, formerly the last FTP packet of FlowD, may be deleted or overwritten when being replaced by p9.

Additional processor configurations may be stored in the configuration storage 312 coupled to the programmable hardware processor 310. Changing the configuration may change the manner in which the programmable hardware processor 310 identifies, stores, and/or indexes network packets having characteristics of interest. For example, in situations where a configuration update changes the characteristics of interest, the programmable hardware processor 310 may process received packets according to the new characteristics of interest, e.g., deleting and/or overwriting existing packets stored in the second and third storage devices. As noted above, many other variations on the actions performed by the programmable hardware processor 310 exist, and may be implemented changing the processor's configuration.

Figure 4:
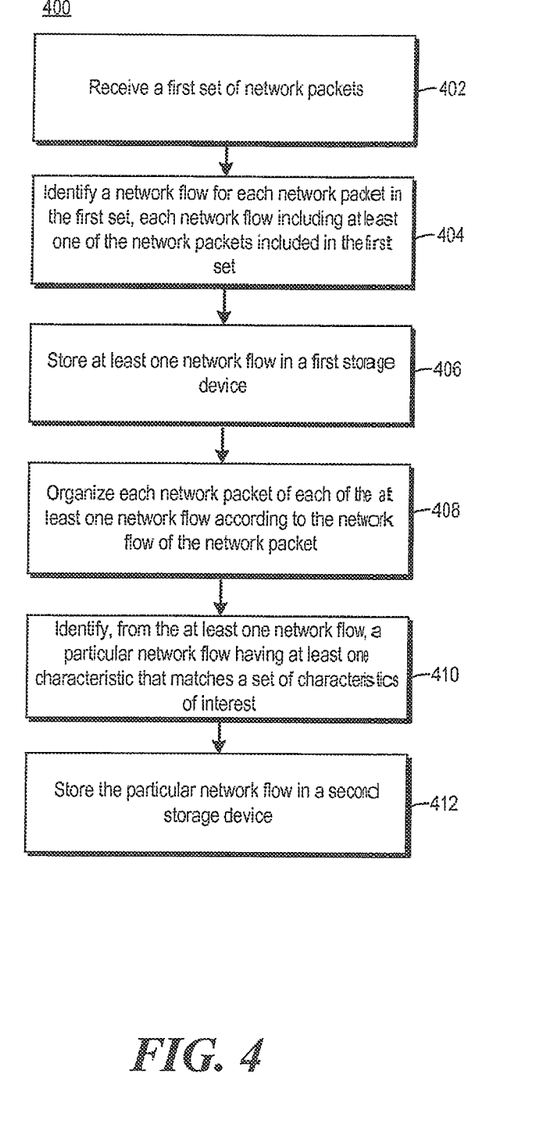
FIG. 4 is a flowchart of an example method for organizing and storing network communications.

FIG. 4 is a flowchart of an example method 400 for organizing and storing network communications. The method 400 may be performed by a programmable hardware processor, such as the programmable hardware processor described in FIG. 1. Other programmable hardware processors or combinations of programmable hardware processors may also be used to execute method 400. Method 400 may be implemented, for example, in the form of electronic circuitry.

A first set of network packets is received (402). In some implementations, the first set of network packets is received in one or more batches of network packets. In some implementations, the first set of network packets is received as a stream of network packets, e.g., a stream of network packets as they flow through a network.

A network flow is identified for each packet in the first set, each network flow including at least one of the network packets included in the first set (404). Network packets may be identified as belonging to a network flow in a variety of ways. In some implementations, the network flow is identified based on a source and destination address of the network packet, a source and destination port for the network packet, and/or a network protocol of the network packet.

At least one network flow is stored in a first storage device (406). The first storage device may be designed to function at a high rate of speed, as the ability to store network packets quickly may facilitate storing every packet received, or a large subset of the packets received, in a high speed network. RAM, for example, is one type of storage device which is capable of functioning at a high rate of speed, and may be used as the first storage device.

As noted above, in some implementations only a subset of the network flows are stored in the first storage device. For example, a programmable hardware processor may be configured to store—in the first storage device—only network packets having source addresses within a certain range of addresses. As another example, a programmable hardware processor may be configured to avoid storing—in the first data storage device—certain types of network packets, e.g., network packets using a particular network protocol.

Each network packet of the at least one network flow is organized according to the network flow of the network packet (408). For example, each network packet may be sorted and/or indexed according to its corresponding network flow. Organizing network packets according to their network flow may, for example, facilitate searching the first storage device for certain packets of interest.

A particular network flow having at least one characteristic that matches a set of characteristics of interest is identified (410). For example, a characteristic of interest may be network packets having a source IP address within a certain range of IP addresses. In this example, a particular network flow having packets that originate from a source device having an IP address within the range may be identified as the particular network flow of interest.

The particular network flow is stored in a second storage device (412). For example, the network packets included in the particular network flow may be copied or moved from the first storage device to the second storage device. The particular network flow may, in some implementations, also be organized according to its network flow.

In some implementations, additional characteristics and additional stages of storage may be used to store network packets with particular characteristics of interest. For example, from the particular network flow stored in the second storage device, network packets specifying a particular source network port may be identified as packets of interest and stored in a third storage device.

In some implementations, a single stage of storage may have multiple storage devices for storing network packets with different characteristics of interest. For example, packets of interest may include packets specifying a particular source port or a particular destination port, and one storage device may be used to store packets specifying the particular source port, while another storage device may be used to store packets specifying the particular destination port.

In some implementations, new network packets are periodically received. Newly received network packets may be stored and organized in the same manner as prior network packets, e.g., storing them according to their network flows—specifying new network flows as appropriate. Newly received network packets may replace the first set of network packets. For example, the first storage device may be periodically purged, or gradually overwritten as new packets replace older packets. In some implementations, newly received packets are assigned to a network flow and matched with an existing network flow to combine packets of the same flow. In some implementations, an existing flow may be identified for newly received packets prior to assigning a network flow to the newly received packets.

In some implementations, an updated configuration for the programmable hardware processor may be obtained. The updated configuration may specify a new set of characteristics of interest, and newly received network packets and/or flows may be stored in the second stage of storage, and/or in later stages of storage, according to the new set of characteristics of interest. For example, a different range of source IP addresses may be specified as characteristics of interest in an updated configuration, resulting in a different set of network packets being identified and stored as network packets of interest.

The selective storage and organizing of network packets of interest facilitates analysis of network traffic traversing a network. For example, an administrator may be able to quickly identify all network traffic originating from devices within a certain IP address range, or to identify all network traffic using a particular network protocol, by searching network packets indexed in one of the multiple storage stages. Other devices, such as analytics devices designed to identify trends, security threats, and network anomalies, may also benefit from the ability to quickly identify particular types of network traffic.

The foregoing disclosure describes a number of example implementations for organizing and storing network communications. As detailed above, examples provide a mechanism for using programmable hardware processors to quickly identify network traffic of interest and store/organize the network traffic in multiple stages of storage.

We claim:

1. A system for inspecting network traffic transmitted over a computer network, the system comprising:
    a first programmable hardware processor that is coupled to a first storage device, the first programmable hardware processor being programmed with a first configuration to store a set of network packets in the first storage device;
    a second programmable hardware processor that is coupled to a second storage device, the second programmable hardware processor being programmed with a second configuration to identify, from among the set of network packets stored in the first storage device, a first subset of network packets that have a first characteristic of interest that is specified in the second configuration and to store the identified first subset of network packets in the second storage device;
    a third programmable hardware processor that is coupled to a third storage device, the third programmable hardware processor being programmed with a third configuration to identify, from among the first subset of network packets stored in the second storage device, a second subset of network packets that have a second characteristic of interest that is specified in the third configuration and to store the identified second subset of network packets in the third storage device; and
    a third party device that is configured to inspect network packets stored in the first storage device, the second storage device, or the third storage device to identify a network security threat,
    wherein the first, second, and third storage devices are different devices.

2. The system of claim 1, wherein the network security threat is presence of malware in the set of network packets.

3. The system of claim 1, wherein the third party device is configured to update the second configuration for the second programmable hardware processor to specify a new characteristic of interest that is different from the first characteristic of interest, wherein the new characteristic of interest and the first characteristic of interest are indicative of malware.

4. The system of claim 1, wherein the third party device is configured to update the third configuration for the third programmable hardware processor to specify a new characteristic of interest that is different from the second characteristic of interest, wherein the new characteristic of interest and the second characteristic of interest are indicative of malware.

5. The system of claim 1, wherein the first, second, and third storage devices are of different device types.

6. The system of claim 1, further comprising:
    a source device that is configured to transmit the set of network packets over the computer network.

7. The system of claim 6, wherein the source device comprises a router of the computer network.

8. A method of inspecting network traffic of a computer network, the method comprising:
    storing a first set of network packets in a first storage device;
    identifying, by a first programmable hardware processor, a first subset of network packets of the first set of network packets that is stored in the first storage device and have a first characteristic of interest that is specified in a configuration for the first programmable hardware processor;
    storing, by the first programmable hardware processor, the first subset of network packets in a second storage device;
    identifying, by a second programmable hardware processor from among the first subset of network packets stored in the second storage device, a second subset of network packets that have a second characteristic of interest that is specified in a configuration for the second programmable hardware processor;
    storing, by the second programmable processor, the second subset of network packets in a third storage device; and
    inspecting, by a third party device, network packets stored in the first storage device, the second storage device, or the third storage device for a network security threat.

9. The method of claim 8, wherein the network security threat is presence of malware among the first set of network packets.

10. The method of claim 8, wherein the first and second characteristics of interest are indicative of malware.

11. The method of claim 8, further comprising:
    purging the first subset of network packets from the second storage device after storing the first subset of network packets in the second storage device.

12. The method of claim 8, wherein the first set of network packets is stored in the first storage device comprising random access memory (RAM).

13. The method of claim 12, wherein the first subset of network packets is stored in the second storage device comprising solid state drive (SSD).

14. The method of claim 8, further comprising:
    updating the configuration for the first programmable hardware processor to an updated configuration, the updated configuration specifying a new characteristic of interest;
    storing, by the first programmable processor, network packets that have the new characteristic of interest in the second storage device; and
    inspecting the network packets stored in the second storage device for network security threats.

15. A system for inspecting network traffic of a computer network, the system comprising:
    a first storage device, a second storage device, and a third storage device that are different storage devices;
    a first programmable hardware processor that is programmed with a first configuration to identify, from among a set of network packets stored in the first storage device, a first subset of network packets that have a first characteristic of interest that is specified by the first configuration and to store the identified first subset of network packets in the second storage device;
    a second programmable hardware processor that is programmed with a second configuration to identify, from among the first subset of network packets stored in the second storage device, a second subset of network packets that have a second characteristic of interest that is specified by the second configuration and to store the identified second subset of network packets in the third storage device; and a third party device that is configured inspect packets stored in the first storage device, the second storage device, or the third storage device for a network security threat.

16. The system of claim 15, wherein the network security threat is presence of malware in the set of network packets.

17. The system of claim 15, wherein the third party device is configured to update the first configuration for the first programmable hardware processor to specify a new characteristic of interest that is different from the first characteristic of interest, wherein the new characteristic of interest and the first characteristic of interest are indicative of malware.

18. The system of claim 15, wherein the first, second, and third storage devices are of different device types.

19. The system of claim 15, further comprising:

a source device that is configured to transmit the set of network packets over the computer network.

20. The system of claim 19, wherein the source device comprises a router of the computer network.

* * * * *